(12) United States Patent
Weber et al.

(10) Patent No.: US 7,157,063 B2
(45) Date of Patent: Jan. 2, 2007

(54) PROCESS FOR THE UTILIZATION OF VANADIUM FROM CHROMIUM ORE AS VANADIUM (V) OXIDE

(75) Inventors: Rainer Weber, Odenthal (DE); Hans-Dieter Block, Leverkusen (DE); Michael Batz, Leichlingen (DE); Jost Halstenberg, Köln (DE); Michael Lumm, Köln (DE); Roland-Luiz Roth, de Buenos Aires (AR); Dawie Van Der Merre, Newcastle (ZA)

(73) Assignee: Bayer Aktiengesellschaft, Leverkusen (DE)

( * ) Notice: Subject to any disclaimer, the term of this patent is extended or adjusted under 35 U.S.C. 154(b) by 623 days.

(21) Appl. No.: 10/404,192

(22) Filed: Apr. 1, 2003

(65) Prior Publication Data

US 2004/0026330 A1    Feb. 12, 2004

(30) Foreign Application Priority Data

Apr. 18, 2002  (DE) ................ 102 17 206

(51) Int. Cl.
*C22B 34/00*  (2006.01)
*C01G 31/00*  (2006.01)

(52) U.S. Cl. .......................... 423/65; 423/66; 423/165; 423/594.17

(58) Field of Classification Search ............... 423/65, 423/66, 165, 594.17
See application file for complete search history.

(56) References Cited

U.S. PATENT DOCUMENTS

| | | | | | |
|---|---|---|---|---|---|
| 2,357,988 | A | * | 9/1944 | Wirt et al. | 423/57 |
| 2,583,591 | A | * | 1/1952 | Perrin et al. | 423/57 |
| 2,697,650 | A | * | 12/1954 | Hixson et al. | 423/58 |
| 5,250,274 | A | * | 10/1993 | Lonhoff et al. | 423/61 |

FOREIGN PATENT DOCUMENTS

| | | | |
|---|---|---|---|
| EP | 047799 | * | 3/1982 |
| EP | 453913 | * | 4/1991 |

* cited by examiner

*Primary Examiner*—Steven Bos
(74) *Attorney, Agent, or Firm*—Norris McLaughlin & Marcus PA

(57) ABSTRACT

Process wherein the vanadium present in the chromium ore chromite is recovered as vanadium pentoxide during the course of the fusion of the chromium ore with alkali and its work-up to produce sodium chromate solution and sodium dichromate.

11 Claims, No Drawings

PROCESS FOR THE UTILIZATION OF VANADIUM FROM CHROMIUM ORE AS VANADIUM (V) OXIDE

The invention relates to a process in which the vanadium present in the chromium ore chromite is recovered as vanadium pentoxide during the course of the fusion of the chromium ore with alkali and its work-up to produce sodium chromate solution and the important chromium chemical, sodium dichromate.

BACKGROUND OF THE INVENTION

All processes described in the prior art for producing sodium dichromate $Na_2Cr_2O_7 \cdot 2 H_2O$ via sodium chromate solution employ a procedure having the same principle:

Chromium spinal or chromite is mixed with sodium carbonate and/or sodium hydroxide and iron oxide (recycled ore residue) and heated at 1000–1100° C. in the presence of oxygen. The sodium chromate produced is leached from the resulting reaction mixture by means of water at a controlled pH. During this procedure, the vanadium present in the chromite also goes into solution as sodium vanadate. Control of the pH is necessary to suppress the dissolution of iron, aluminum, silicon and magnesium. In general, addition of an acid, e.g. a dichromate solution, is necessary to adjust the pH. After leaching with water is complete, the sodium chromate solution produced is converted into a sodium dichromate solution by addition of sulphuric acid or preferably of carbon dioxide under pressure. Solid sodium dichromate is recovered from the solution by evaporation and crystallization. This process is described in BÜCHNER, SCHLIEBS, WINTER, BÜCHEL "Industrielle Anorganische Chemie", Weinheim 1984, and in Ullmann's Encyclopedia of Industrial Chemistry, Fifth ed., Vol A 7, Weinheim 1986, p. 67–97.

It has now been found that the vanadium content of the sodium dichromate (about 0.2% of $V_2O_5$ in the $Na_2Cr_2O_7 \cdot 2 H_2O$) interferes in various applications of the sodium dichromate and its downstream products, so that purification of the sodium chromate fusion solution to remove the vanadium before conversion into sodium dichromate is made necessary.

The removal of vanadium is preferably carried out by addition of calcium oxide to the sodium chromate solution produced by leaching and filtration to remove insoluble material. The solution is in this way brought to a pH of 12–13 (EP-A-0 047 799, EP 0 453 913 B1), resulting in precipitation of a filterable calcium hydroxyvanadate $Ca_5(OH)(VO_4)_3$. The removal of the calcium which has been introduced in excess is carried out by subsequent precipitation of calcium carbonate from the sodium chromate solution, as described in EP 0 453 913 B1.

A consequence of the precipitation of calcium hydroxyvanadate from a solution having a high concentration of chromate ions is the high contamination of the calcium hydroxyvanadate by coprecipitated calcium chromate and sodium chromate and by entrained calcium oxide. The $V_2O_5$ content of the dried "calcium vanadate" precipitate is about 10–20% and is thus significantly below the $V_2O_5$ content of pure calcium hydroxyvanadate $Ca_5(VO_4)_3OH$ of 48.7%, but also significantly higher than the $V_2O_5$ content of naturally occurring vanadium-containing ore of not more than 2.4% of $V_2O_5$ (cf. Ullmann's Encyclopedia of Industrial Chemistry, 5$^{th}$ ed., Vol. A27, p. 370). The "calcium vanadate" precipitate is thus an attractive starting material for producing vanadium oxide, due to its high vanadium content and high reactivity due to its finely divided nature and low crystallinity. In addition, the disposal of such a material as waste in a landfill is undesirable because of the release of chromate and vanadate to the environment which would occur over time, and the material therefore has to be made inert by treatment with reducing agents such as iron(II) sulphate or sulphur dioxide or the like before it can be disposed of in a landfill.

In the processing of this calcium vanadate precipitate, its valuable constituents, namely vanadium as V in the oxidation state +5, and chromium as Cr in the oxidation state +6, have to be obtained as separate or easily separable species; the vanadium in particular as a readily usable and commercial grade vanadium chemical and the chromium as utilizable, e.g. able to be reintroduced into the chromate production process, i.e. recyclable, species or solution; the readily soluble sodium which is undesirable in the wastewater as a utilizable, recyclable species and the calcium as an insoluble species which can be disposed of in a landfill or used as precursor of a reusable calcium oxide or reusable calcium chromate or calcium dichromate.

Solutions containing sodium ions and chromium in the oxidation state +6 can be reintroduced into the chromate production process only if they do not contain appreciable amounts (e.g. >0.1%) of interfering extraneous material. However, any elements and oxidation states which are not already present to an appreciable extent in the product stream into which this solution is to be introduced are problematic. For this reason, only water $H_2O$, hydroxide $OH^-$ or hydroxonium $H_3O^+$ ions, carbonate, bicarbonate, carbon dioxide, chromate, dichromate, polychromate, chromic acid, sodium and also calcium and vanadate in very minor concentrations are acceptable as constituents of these solutions which are to be reintroduced. Depending on the pH, these solutions can be introduced into the acidification steps of the sodium chromate process (e.g. after or during leaching of the furnace clinker) or the alkalization steps (e.g. before or during vanadate precipitation).

The digestion of the calcium vanadate precipitate by means of sulphuric acid, separation of the precipitated calcium sulphate from the solution in accordance with a treatment of insoluble calcium salts which is frequently practised in industry, and subsequent precipitation of the vanadium as $V_2O_5$ from the filtrate by means of sulphuric acid is one way of removing virtually all of the vanadium.

However, a consequence is that the chromium is obtained as a polychromate or chromic acid solution having a high sulphate content. As the many proposals for removing sulphate from sodium chromate and dichromate demonstrate, the amounts of sulphate always introduced as sulphuric acid in earlier processes for producing sodium chromate and sodium dichromate are nowadays totally undesirable for further processing of these products (EP 0 453 913 B1).

Another possible way of treating sparingly soluble salts is digestion of the calcium vanadate precipitate by means of sodium carbonate in aqueous solution and subsequent precipitation of the vanadium as ammonium metavanadate $(NH_4)_4V_4O_{12}$, also referred to as $NH_4VO_3$ for short, by addition of an excess of ammonium salts. Ammonium metavanadate is a versatile intermediate, in particular in the route to the most important vanadium chemical $V_2O_5$ (cf. Ullmann's Encyclopedia of Industrial Chemistry, 5$^{th}$ edition, Vol. A27, Weinheim 1996). However, in this case too, the resulting solution containing the chromium as chromate is contaminated with the ions of the precipitation reagent, i.e. with ammonium ions and the associated anions, and can therefore not be reused or recycled without problems. Furthermore, the proportion of the vanadium in the calcium hydroxyvanadate which is dissolved by means of sodium carbonate is less than 50% and therefore completely unsatisfactory unless economically nonviable sodium carbonate excesses are employed.

The routes known from the prior art are therefore not suitable for dissolving vanadium from the calcium vanadate precipitate obtained from the sodium chromate production process in such a way that readily utilizable and commercial grade vanadium chemical can be obtained, and the valuable chromium present also obtained as a usable or recyclable product according to the above-described requirement.

SUMMARY OF THE INVENTION

The present invention now provides a route by means of which the vanadium present in the leaching solution from the fusion of chromium ore with alkali can be obtained as valuable vanadium oxide $V_2O_5$.

DETAILED DESCRIPTION

The present invention therefore relates to a process for recovering the vanadium present in the chromium ore chromite as vanadium pentoxide in the course of the preparation of sodium chromate and sodium dichromate, characterized by 1. precipitation of a calcium vanadate precipitate from the sodium chromate solution (after pH-controlled removal of the residue from the chromium ore) by addition of calcium oxide, calcium hydroxide, calcium dichromate or calcium chromate at pH 12–13 set by addition of sodium hydroxide to the sodium chromate solution,
2. separation of the calcium vanadate precipitate from the solution by customary solid/liquid separation operations, e.g. by filtration or centrifugation, and, if appropriate, washing of the precipitate with water or with water which has been made alkaline by means of dilute sodium hydroxide solution,
3. treatment of the calcium vanadate precipitate with from 1.5 to 10 times its amount of water (ratio based on the dry weight of the residue), preferably from 2 to 4-fold quantity of water, and (a) at least that quantity of sodium carbonate which is stoichiometrically equivalent to the calcium content of the precipitate or an excess of sodium carbonate and the amount of carbon dioxide or sodium bicarbonate necessary to set the pH to 8.5–12.3, preferably 9–11, or (b) with a molar amount of sodium hydrocarbonate which is at least 1.0 times the molar amount of calcium in the precipitate (stoichiometry based on the $CO_2$ content) or an up to 3-fold molar excess of sodium hydrocarbonate, preferably from 1.3- to 2-fold amount of sodium hydrocarbonate, or (c) with carbon dioxide in an at least stoichiometric amount based on the calcium content and sodium hydroxide in the amount necessary to set a pH of at least 8, with this treatment preferably being carried out at an elevated temperature in the treatment solution, e.g. from 50 to 110° C., for a time of from about 0.1to 5 hours, preferably from 0.5 to 1.5 hours,
4. separation of the calcium carbonate formed from the solution by means of customary solid/liquid separation operations and washing of the calcium carbonate,
5. acidification of the aqueous phase obtained with chromic acid or a mixture of sodium dichromate/chromic acid (sodium polychromate), preferably as a concentrated solution in water, to a pH of below 4, preferably from 1.4 to 1.0, very particularly preferably from 1.4 to 1.2, at elevated temperatures, preferably at 80° C., and finally
6. separation of the precipitated vanadium pentoxide $V_2O_5$ from the solution by means of customary solid/liquid separation operations, washing of the $V_2O_5$ with water and drying of the $V_2O_5$.

If desired, part of the carbonate or bicarbonate which has been used in excess can be recovered as sodium bicarbonate after step 4 and before step 5 by passing carbon dioxide into the solution at a pH of from about 7 to 9 under a carbon dioxide pressure of from 0.9 to 10 bar and cooling the solution to from about −10 to 20° C., preferably from 0 to 5° C., and separation of the precipitated sodium bicarbonate from the solution.

The calcium carbonate obtained in step 4 can be passed to calcium oxide production for use in step 1, or can be converted into calcium chromate or calcium dichromate or calcium polychromate solution by reaction with sodium dichromate or sodium dichromate/sodium polychromate solution or sodium polychromate/chromic acid solution, or, if desired, can be deposited in a landfill as a nonhazardous, insoluble waste material or be used as an auxiliary in steel production. All other streams obtained can be fed back into the sodium chromate production process directly and without further treatment. The washing water which may be obtained in step 2 together with the filtrate generated previously forms the sodium chromate stream for further conversion into sodium dichromate. The sodium bicarbonate which is produced in the step which may optionally be inserted between steps 4 and 5 is added to the sodium bicarbonate which is formed in large quantities in the acidification step in which sodium chromate is converted into sodium dichromate by means of carbon dioxide under pressure and the combined sodium bicarbonate is passed to sodium carbonate production for the chromite fusion. The filtrate obtained in step 6 and the washing water contain sodium dichromate, sodium polychromate and/or chromic acid in amounts corresponding to the ratio applicable for the selected pH and are passed as acidification agent to the leaching of the furnace clinker, with full recovery of the chromium content.

The entire process and also the individual steps can be carried out either batchwise or continuously.

The invention is illustrated by the following examples:

EXAMPLE 1

About 50 kg of the calcium vanadate precipitate. (more accurately: calcium hydroxy-vanadate) precipitated from sodium chromate solution at pH 12.5 (setting of pH by means of sodium hydroxide, addition of Ca as CaO) are dried at 110° C. for 5 hours and then have the following analytical composition:

| | |
|---|---|
| 10.2% V = | 18.2% $V_2O_5$ |
| 7.3% Cr = | 14.0% $CrO_3$ |
| 29.1% Ca = | 40.7% CaO |
| 5.2% Na = | 7.0% NaO |
| 1.3% $CO_3^{2-}$ | |

Main constituents are therefore about 38% of calcium vanadate $Ca_5(VO_4)_3OH$, about 10% of calcium chromate $CaCrO_4$, about 18% of CaO and about 13% of sodium chromate $Na_2CrO_4$.

EXAMPLE 2

200 g of the dry calcium vanadate precipitate prepared in Example 1 are in each case mixed with 400 g of water and 155 g of sodium carbonate. The mixture is heated to 60° C. while stirring. To set the desired pH values, carbon dioxide from a pressure bottle is introduced. The reaction mixture is stirred at 90° C. for 2 hours while continuing to monitor and adjust the pH. The mixture is then filtered and the filtrate is analysed for chromium(VI) and vanadium(V). The filter residue is stirred twice in succession with 250 ml in each case of water at 60° C. for 10 minutes and then filtered off again. The washing water obtained as filtrate is likewise analysed for chromium(VI) and vanadium(V). The filter residue which remained is dried at 110° C.

The results of the experiments carried out at pH 9, pH 10 and pH 11 are shown in the following table.

EXAMPLES 2a, 2b, 2c

| Example | PH | V yield [%] | | | Cr yield [%] | | | Amount of residue [g] |
|---|---|---|---|---|---|---|---|---|
| | | Filtrate | Washing water | Total | Filtrate | Washing water | Total | |
| 2 a | 9 | 63.8 | 27.9 | 91.7 | 65.7 | 27.8 | 93.5 | 196 |
| 2 b | 10 | 79 | 16.8 | 95.8 | 74.0 | 18.1 | 92.4 | 169 |
| 2 c | 11 | 77.9 | 19.3 | 97.2 | 77.4 | 18.5 | 95.9 | 164 |

*% figures are percentages of the amount used

EXAMPLE 3

5 kg of the dry calcium vanadate precipitate prepared in Example 1 are mixed with 11 l of water, 3700 g of sodium bicarbonate and 1000 g of sodium carbonate and heated to 90° C. while stirring vigorously. After one hour at this temperature, the calcium carbonate precipitate formed is filtered off and the filtrate is isolated. The precipitate is stirred twice in succession with 6.5 l each time of water at 90° C. for 10 minutes and then filtered off again. The washing water obtained is isolated.

The filtrate from the calcium carbonate precipitation is transferred to a closable stainless steel vessel and in this vessel is cooled and at the same time treated with carbon dioxide gas. After displacement of the air by the carbon dioxide gas, the stainless steel vessel is closed and further carbon dioxide gas is introduced in the amount necessary to maintain a pressure of 3 bar. After a temperature of −5° C. has been reached, the mixture is stirred for another 30 minutes, the stirrer is then turned off and the contents of the stainless steel vessel are then pushed out onto a filter by means of the carbon dioxide atmosphere.

The sodium bicarbonate which has been filtered off is dried at 110° C. and then weighs 1990 g as sodium carbonate.

The filtrate from the sodium bicarbonate precipitation is combined with the washing water from the calcium carbonate precipitation, and the liquid mixture obtained serves as starting material in some subsequent experiments. The vanadium(V) content was determined as 19.3 g of V/litre, and the chromium(V) content was determined as 13.3 g of Cr/litre.

EXAMPLE 4

1 l of the solution obtained in Example 3 is heated to 85° C. and then admixed while stirring with a solution of chromic acid (300 g of $CrO_3$/l) until a pH of 1.4 has been reached. Vanadium(V) oxide starts to precipitate during the addition. The mixture is stirred for another 10 minutes, and the vanadium(V) oxide is then filtered off, washed with 100 ml of water, sucked dry and dried at 110° C. for 5 hours.

The yield of $V_2O_5$ is 27.9 g, corresponding to a yield of 81% of theory. The chromium content of the $V_2O_5$ was determined as 0.7%.

EXAMPLE 5

1 l of the solution obtained in Example 3 is heated to boiling and then admixed with a chromic acid/sodium polychromate solution at such a rate that foaming over is avoided. The addition is stopped when a pH of 1.2 has been reached. The chromic acid/sodium polychromate solution is the mother liquor from the crystallization of chromic acid from an electrochemically deacidified (to an extent of 65%) sodium dichromate solution and has a degree of deacidification of 56%, i.e. the formal ratio of dichromate to chromic acid is 1:2.55 and the concentration of chromium is 33.15% of Cr, corresponding to 95% of NDC equivalents. After stirring the reaction mixture for another 10 minutes at the boiling point, it is cooled while stirring to about 30° C. and then filtered. The filter residue is washed with 40 ml of cold water and then dried at 110° C. for 5 hours (NDC=sodium dichromate).

The yield of $V_2O_5$ is 29.2 g, corresponding to a yield of 85% of theory. The chromium content of the $V_2O_5$ was 0.5%.

EXAMPLE 6

845 ml of digestion solution and filter cake washing water from experiment 2b, containing $V_2O_5$ in a concentration of 41.3 g of $V_2O_5$/l, are heated to 100° C. and slowly admixed with a chromic acid solution (300 of $CrO_3$/l). The addition of chromic acid is stopped when a pH of 1.5 has been reached. After 80 minutes, the precipitated $V_2O_5$ is filtered off, washed with 100 ml of pure water, sucked dry and dried at 120° C./4 hours. The yield is 36.5 g of $V_2O_5$ corresponding to 88.4% of theory.

The vanadium content of the filtrate combined with the washing water is 2.5 g of V/l.

We claim:

1. A process for recovering vanadium from a vanadium-containing sodium chromate solution obtained from the fusion of a chromium ore with alkali, which comprises the steps of:

(a). adjusting the pH of the sodium chromate solution to 12–13 by addition of sodium hydroxide and adding calcium oxide, calcium hydroxide, calcium dichromate or calcium chromate to the sodium chromate solution to precipitate calcium hydroxyvanadate ($Ca_5(VO_4)_3OH$),
(b) separating the calcium hydroxyvanadate precipitate from the solution,
(c) mixing the calcium hydroxyvanadate precipitate with water in an amount of from 1.5 to 10 times the dry weight of the calcium hydroxyvanadate precipitate and
  (i) at least that amount of sodium carbonate which is stoichiometrically equivalent to the calcium content of the precipitate or an excess of sodium carbonate and the amount of carbon dioxide or sodium bicarbonate sufficient to adjust the pH of the resulting solution to 8.5–12.3 to precipitate calcium carbonate, or
  (ii) a molar amount of sodium bicarbonate which is at least 1.0 times the molar amount of calcium in the precipitate, stoichiometrically based on the $CO_2$ content of the precipitate, or an up to a 3-fold molar excess of sodium bicarbonate to precipitate calcium carbonate or
  (iii) carbon dioxide in an at least stoichiometric amount based on the calcium content of the vanadium precipitate and sodium hydroxide in the amount necessary to adjust the pH of the resulting solution to at least 8 to precipitate calcium carbonate,
(d) separating the calcium carbonate from the solution formed in step (c),
(e) acidifying the solution remaining after the separation of calcium carbonate in step (d) with chromic acid or with a mixture of sodium dichromate/chromic acid (sodium polychromate), to a pH below 4 at a temperature of at least 80° C. to precipitate vanadium pentoxide, and finally
(f) separating the precipitated vanadium pentoxide $V_2O_5$ from the solution of step (e).

2. Process according to claim 1, further comprising the step of passing carbon dioxide under a pressure of from 0.9 to 10 bar into the solution after step (d) and before step (e) at a pH of from about 7 to 9, cooling the solution to a temperature of from about −10 to 20° C. to precipitate the excess amount of carbonate or bicarbonate as sodium bicarbonate, and separating the precipitated sodium bicarbonate from the solution.

3. Process according to claim 1, wherein the separation of step (b) is carried out by filtration or centrifugation and the water with which the calcium hydroxyvanadate precipitate is mixed in step (c) optionally is made alkaline by addition of sodium hydroxide.

4. Process according to claim 1 wherein, in step (c), said amount of water is from 2 to 4 times the dry weight of said calcium hydroxyvanadate precipitate.

5. Process according to claim 4, wherein the treatment with carbon dioxide in step (c), variant (iii) is earned out at a solution temperature of from 50 to 110° C. for a time of from about 0.1 to 5 hours.

6. Process according to claim 5, wherein said time is from 0.5 to 1.5 hours.

7. Process according to claim 1, wherein the amount of carbon dioxide or sodium bicarbonate in step (c), variant (i) is an amount sufficient to adjust the pH to 9–11.

8. Process according to claim 1, wherein the molar amount of sodium bicarbonate in step (c), variant (ii) is a 1.3–2-fold molar excess.

9. Process according to claim 1, wherein said solution is acidified in step (e) to a pH of from 1.4 to 2.0.

10. Process according to claim 9, wherein said pH is from 1.4 to 1.2.

11. Process according to claim 2, wherein said temperature is from 0 to 5° C.

* * * * *